United States Patent
Gu et al.

(10) Patent No.: US 10,433,336 B2
(45) Date of Patent: *Oct. 1, 2019

(54) METHOD FOR TRANSMITTING AND RECEIVING FRAME IN WIRELESS LOCAL AREA NETWORK AND APPARATUS FOR THE SAME

(71) Applicant: NEWRACOM, INC., Irvine, CA (US)

(72) Inventors: Jabeom Gu, Irvine, CA (US); Sangwon Ki, Irvine, CA (US); Hongsoog Kim, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,513

(22) Filed: Sep. 1, 2017

(65) Prior Publication Data

US 2018/0014324 A1    Jan. 11, 2018

Related U.S. Application Data

(63) Continuation of application No. 14/814,276, filed on Jul. 30, 2015, now Pat. No. 9,781,742.

(30) Foreign Application Priority Data

Jul. 30, 2014 (KR) .......... 10-2014-0097312
Jun. 16, 2015 (KR) .......... 10-2015-0084899

(51) Int. Cl.
*H04W 74/02* (2009.01)
*H04W 84/12* (2009.01)
*H04W 74/00* (2009.01)

(52) U.S. Cl.
CPC .......... *H04W 74/02* (2013.01); *H04W 74/006* (2013.01); *H04W 84/12* (2013.01)

(58) Field of Classification Search
CPC .......... H04W 74/006; H04W 84/12
USPC .......... 370/252–339; 455/509, 512
See application file for complete search history.

(56) References Cited

U.S. PATENT DOCUMENTS

| | | | |
|---|---|---|---|
| 2004/0100929 A1* | 5/2004 | Garcia-Luna-Aceves | H04W 72/1278 370/338 |
| 2011/0188391 A1* | 8/2011 | Sella | H04W 24/10 370/252 |
| 2015/0156722 A1* | 6/2015 | Kim | H04W 74/08 370/311 |
| 2016/0198393 A1* | 7/2016 | Li | H04W 48/12 370/338 |

* cited by examiner

Primary Examiner — Iqbal Zaidi

(57) ABSTRACT

Disclosed are method for transmitting and receiving frame in wireless local area network and apparatus for the same. A communication method performed in a first station, the communication method comprises receiving, through a channel from an access point, a first frame notifying a first period for transmission or reception of a frame; and processing the first frame, wherein a second period exists between the first frame and the first period, and wherein the second period is a contention period during which stations are allowed to contend for the channel. Therefore, performance of WLAN can be enhanced.

18 Claims, 9 Drawing Sheets

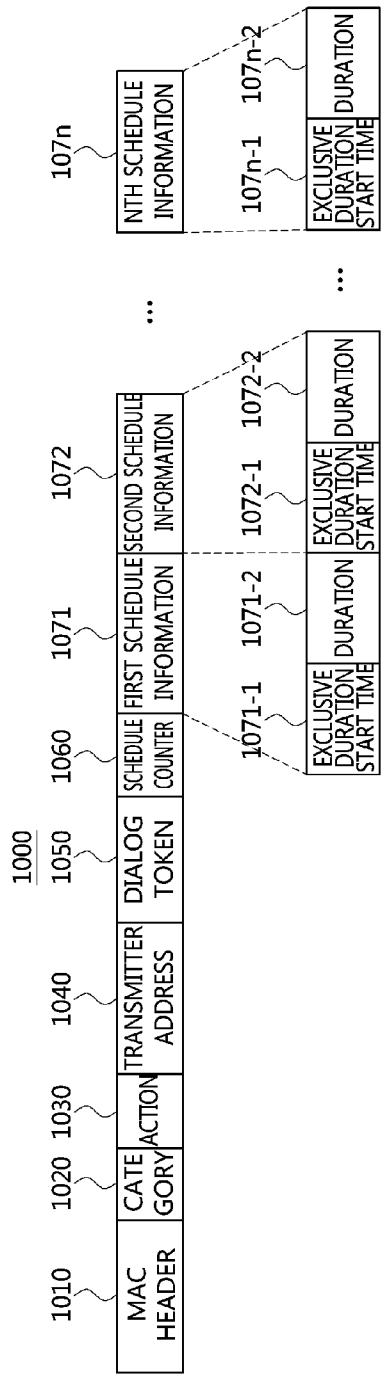
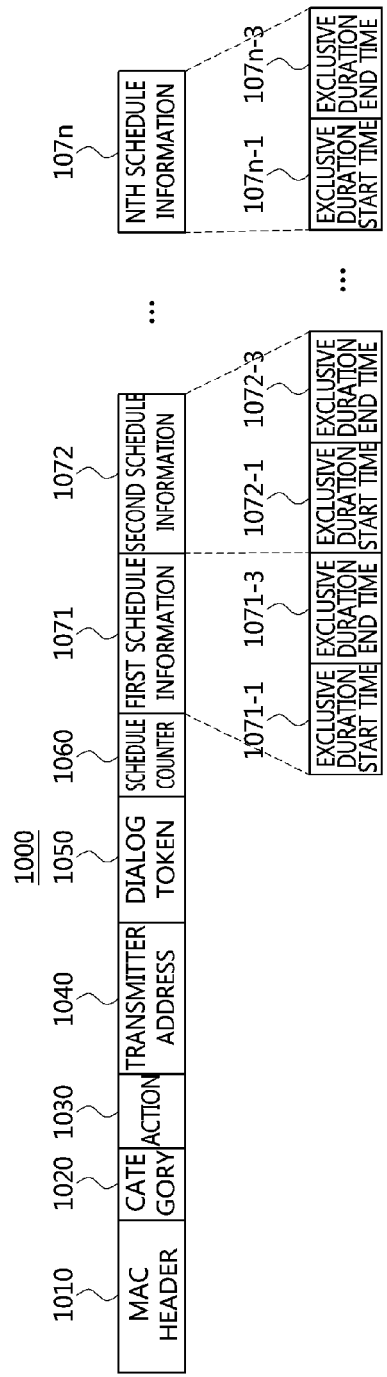

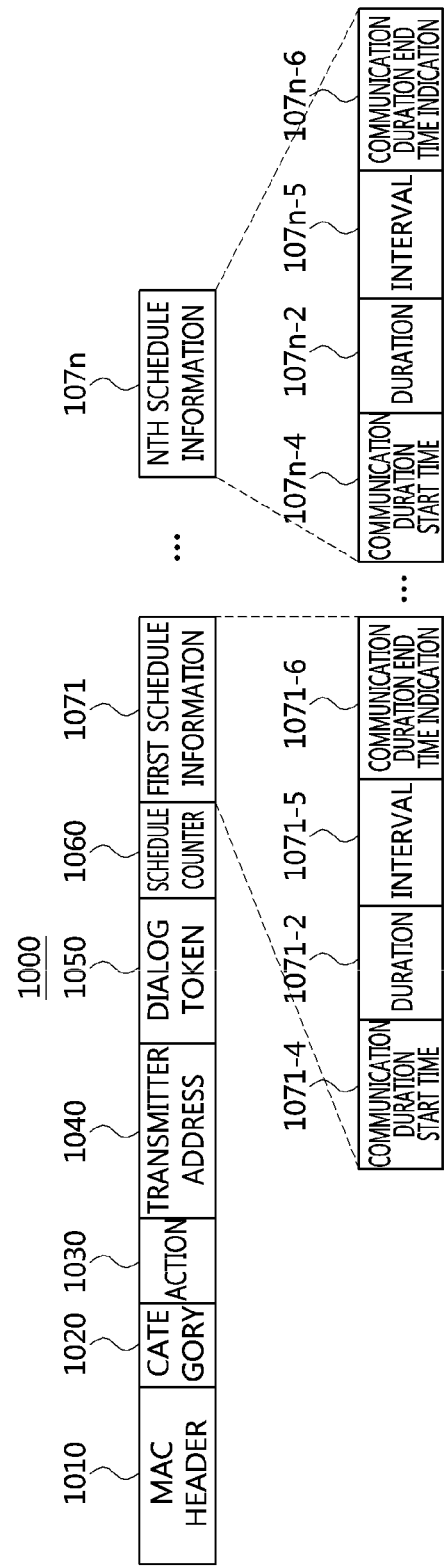

METHOD FOR TRANSMITTING AND RECEIVING FRAME IN WIRELESS LOCAL AREA NETWORK AND APPARATUS FOR THE SAME

CLAIM FOR PRIORITY

This application is a continuation of U.S. Patent application Ser. No. 14/814,276, filed on Jul. 30, 2015, now U.S. Pat. No. 9,781,742, issued Oct. 3, 2017, which claims priority to Korean Patent Application No. 10-2014-0097312 filed on Jul. 30, 2014 and No. 10-2015-0084899 filed on Jun. 16, 2015 in the Korean Intellectual Property Office (KIPO), the entire contents of which are hereby incorporated by reference.

BACKGROUND

1. Technical Field

Example embodiments of the present invention relate in general to the field of wireless local area network (LAN) technology, and more specifically, to a technology for coexistence between wireless LAN technology and other communication technologies.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed to for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

Meanwhile, Bluetooth, long term evolution-unlicensed (LTE-U), Zigbee as well as a wireless local area network (LAN) operate in an industrial, scientific and medical (ISM) band. Since the wireless LAN technology operates using a protocol different from those of other communication technologies, a frame transmitted and received based on the wireless LAN technology may collide with a frame transmitted and received based on other communication technologies. The collision between frames may degrade a wireless LAN system.

SUMMARY

Accordingly, example embodiments of the present invention are provided to substantially obviate one or more problems due to limitations and disadvantages of the related art.

Example embodiments of the present invention provide a method for transmitting and receiving a frame for coexistence between a wireless LAN technology and other communication technologies, and an apparatus for the same.

In order to achieve the objectives of the present invention, a communication method performed in a first station, the communication method comprises receiving, through a channel from an access point, a first frame notifying a first period for transmission or reception of a frame; and processing the first frame, wherein a second period exists between the first frame and the first period, and wherein the second period is a contention period during which stations are allowed to contend for the channel.

Here, the first frame includes a schedule information field, and the schedule information field includes a duration field indicating a duration time of the first period and a start time field indicating a start time of the first period indicated by the duration field.

Here, the first frame includes a schedule information field, and the schedule information field includes a start time field indicating a start time of the first period and an end time field indicating an end time of the first period.

Here, the first frame includes a schedule information field, and the schedule information field includes a start time field indicating a start time of a communication duration including the first period and the second period, a duration field indicating a duration time of the first period, an interval field indicating an interval time between first periods and an end time indicating field including information for indicating an end time of the communication duration.

Here, the first period is a contention-free period during which stations are not allowed to contend for the channel.

In addition, the communication method further comprises generating a second frame requesting the first period for transmission or reception of a frame; and transmitting the second frame through the channel, wherein the first frame is received in response to the second frame.

In addition, the communication method further comprises receiving a third frame in the first period.

In addition, the communication method further comprises transmitting a third frame in the first period.

Here, the first frame includes information about a plurality of first periods each representing a different transmission duration or a different reception duration.

Here, the first frame is transmitted based on a first communication protocol, and a third frame is transmitted or received based on a second communication protocol.

Here, the first station supports a plurality of communication protocols.

In order to achieve the objectives of the present invention, a communication method performed in a first station, the communication method comprises receiving a first frame notifying a first period for transmission or reception of a frame through a channel; and transmitting a second frame in response to the first frame through the channel, wherein a second period exists between a transmission duration of the first frame and the first period, and stations are allowed to contend for the channel in the second period.

Here, the first frame includes a schedule information field, and the schedule information field includes a duration field indicating a duration time of the first period and a start time field indicating a start time of the first period indicated by the duration field.

Here, the first period is a contention-free period during which stations are not allowed to contend for the channel.

Here, the second frame confirms the first period.

In addition, the communication method further comprises receiving a request to send (RTS) frame from a third station; and when a duration indicated by a duration field included in the RTS frame overlaps the first period, transmitting a guard frame to prevent a collision between frames in the overlapping duration.

Here, a duration field of the guard frame indicates a duration time within a range between an end time of the guard frame and a start time of the first period.

In addition, the communication method further comprises transmitting a guard frame in a preset duration prior to a start time of the first period to prevent a collision between frames in the first period.

Here, a duration field of the guard frame indicates a duration time within a range between an end time of the guard frame and an end time of the first period.

Here, the first frame is transmitted based on a first communication protocol, and the frame is transmitted or received based on a second communication protocol.

BRIEF DESCRIPTION OF DRAWINGS

Example embodiments of the present invention will become more apparent by describing in detail example embodiments of the present invention with reference to the accompanying drawings, in which:

FIG. 10A is a block diagram illustrating a SNAV-A frame according to the first example embodiment of the present invention;

FIG. 10B is a block diagram illustrating a SNAV-A frame according to the second example embodiment of the present invention; and FIG. 10C is a block diagram illustrating a SNAV-A frame according to the third example embodiment of the present invention.

DESCRIPTION OF EXAMPLE EMBODIMENTS

Figure 1:
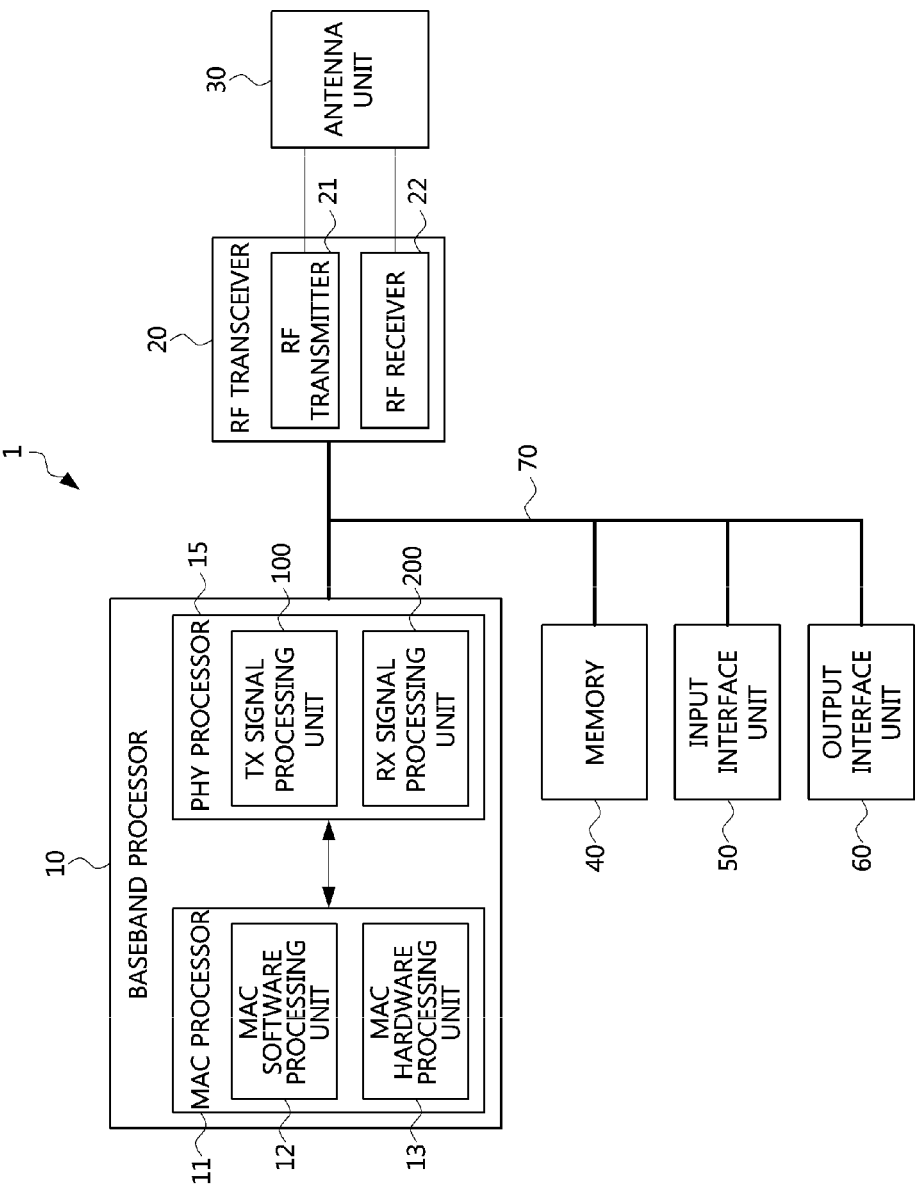
FIG. 1 is a block diagram illustrating a structure of a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a block diagram illustrating a structure of a WLAN device.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this. The PHY processor 15 may include a transmitting signal processing unit 100 and a receiving signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
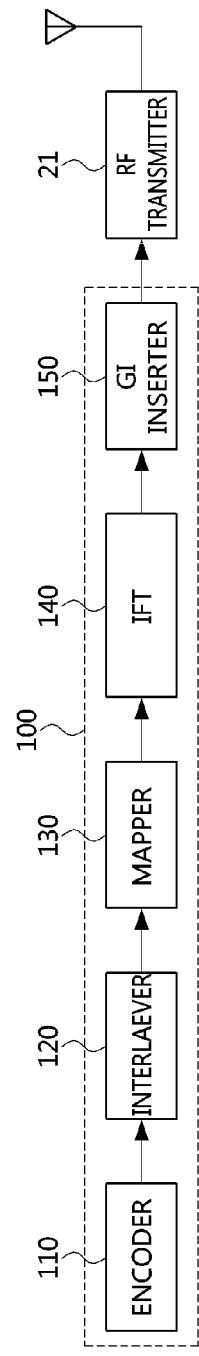
FIG. 2 is a schematic block diagram illustrating a transmitting signal processing unit in a WLAN.

FIG. 2 is a schematic block diagram illustrating a transmitting signal processing unit in a WLAN.

Referring to FIG. 2, a transmitting signal processing unit 100 may include an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0 s or 1 s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of NSS of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
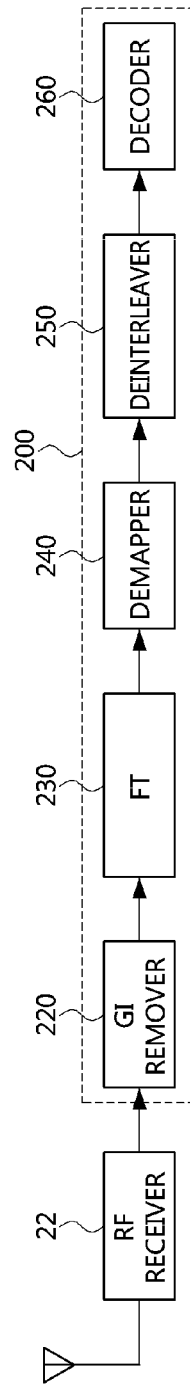
FIG. 3 is a schematic block diagram illustrating a receiving signal processing unit in the WLAN.

FIG. 3 is a schematic block diagram illustrating a receiving signal processing unit in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

Figure 4:
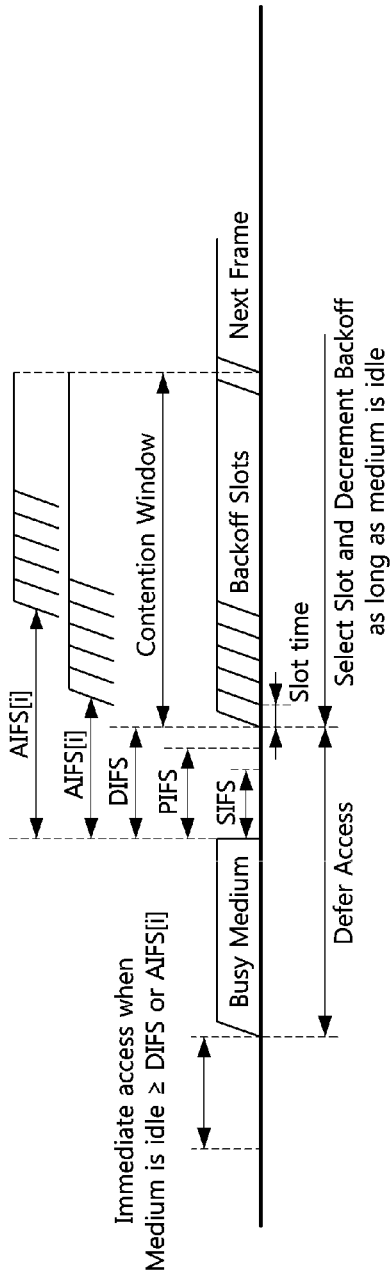
FIG. 4 is a timing diagram illustrating interframe space (IFS) relationships.

FIG. 4 is a timing diagram illustrating interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC] has elapsed. In this case, the data frame, the management frame, or the control frame which is not the response frame may use the AIFC[AC].

Figure 5:
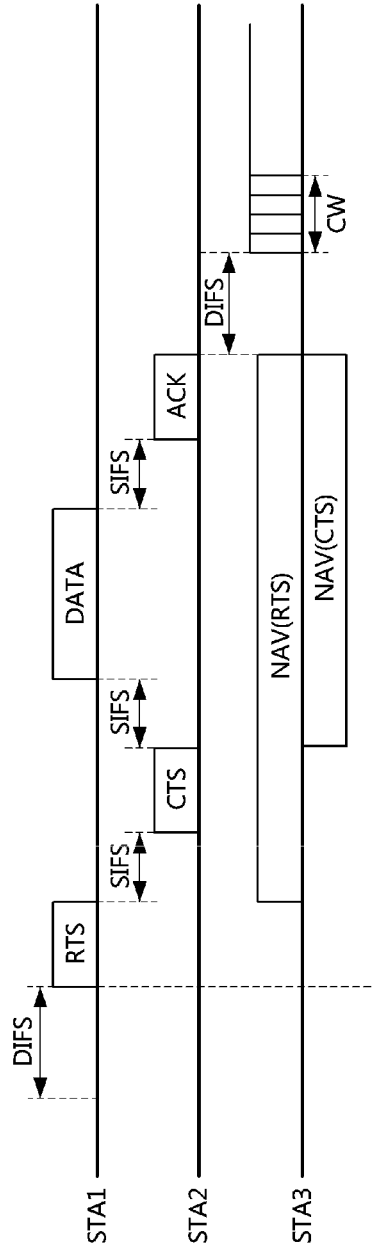
FIG. 5 is a timing diagram illustrating a frame transmission procedure based on a CSMA (carrier sense multiple access)/CA (collision avoidance) manner for avoiding collision between frames in a channel.

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff operation.

Meanwhile, in terms of coexistence with other communication technologies (for example, Bluetooth, long term evolution-unlicensed (LTE-U) and Zigbee) in a wireless local area network (LAN), there is a problem in which interference occurs upon transmission or reception of frames when using a combo chip. Hereinafter, the following description will be made in relation to example embodiments of the present invention which is capable of solving the drawbacks associated with the coexistence of wireless LAN technology and Bluetooth technology, but the present invention is not limited thereto. That is, example embodiments of the present invention can be applied to solving the drawbacks associated with the coexistence between wireless LAN technology and other communication technologies (for example, LTE-U, Zigbee).

In a frame transmission mode, a station provided with a combo chip supporting a wireless LAN technology and a Bluetooth technology (or LTE-U, Zigbee) is capable of identifying when a Bluetooth based frame transmission occurs. Accordingly, the station prevents a collision between a frame transmitted in a wireless LAN scheme and a frame transmitted in a Bluetooth scheme, and accordingly secures frame transmission according to the Bluetooth scheme.

However, in a frame reception mode, a frame received in a Bluetooth scheme may collide with a frame received in a wireless LAN scheme. For example, when a station which has no information about a frame transmitted in a Bluetooth scheme transmits a frame in a wireless LAN scheme in a basic service set (BSS), the frame transmitted in a wireless LAN scheme may collide with a frame transmitted in a Bluetooth scheme. In particular, according to the Bluetooth scheme, an audio data frame having a higher priority than other data frames may be generated approximately every 4 to 5 ms, and has a length corresponding to 600 μs×n(n=1, 3, 5). Since the audio data frame is more likely to collide with a frame transmitted in a wireless LAN scheme, quality of service (QoS) and quality of experience (QoE) are significantly degraded in a wireless LAN system and a Bluetooth system. In addition, when a frame retransmission frequently occurs due to poor channel conditions, QoS and QoE may be further degraded in a wireless LAN system and a Bluetooth system.

Figure 6:
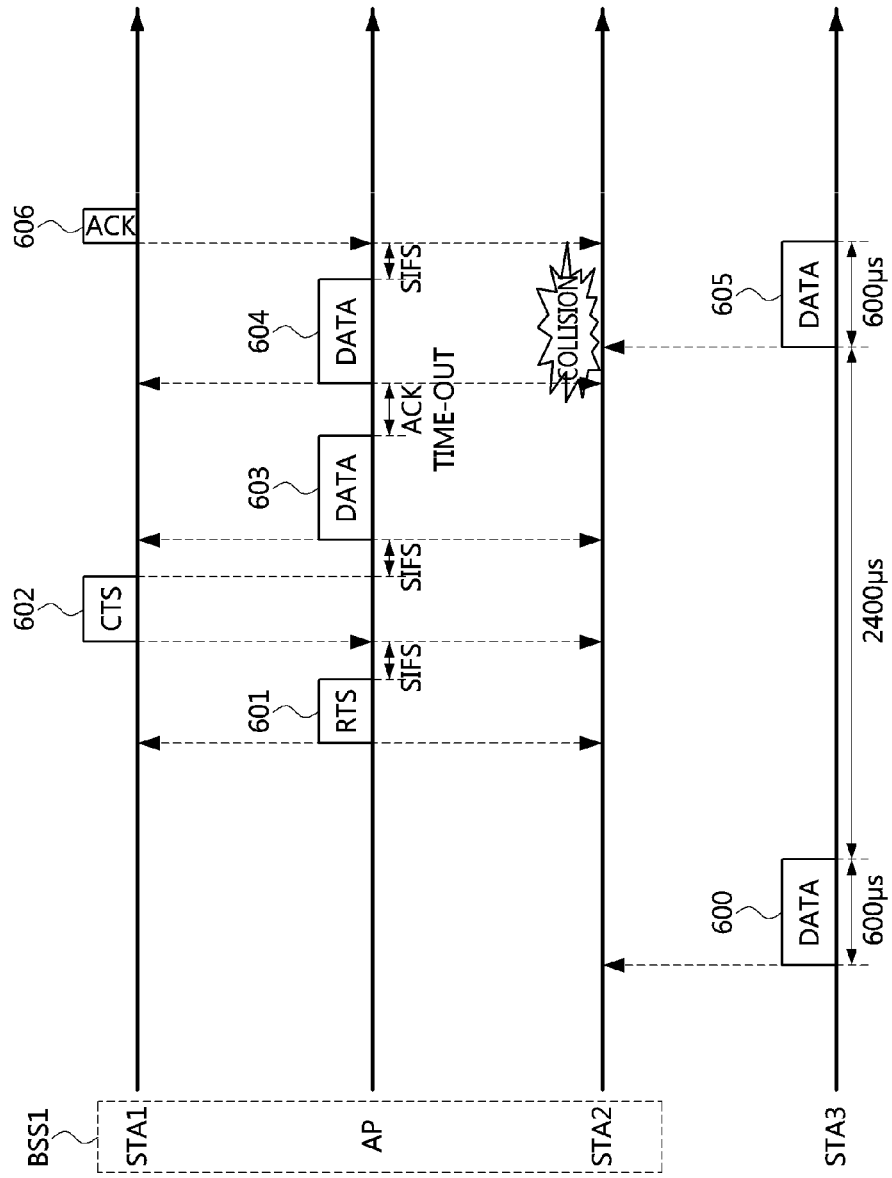
FIG. 6 is a timing chart illustrating a case of collision occurring between frames.

FIG. 6 is a timing chart illustrating a case of a collision occurring between frames.

Referring to FIG. 6, an access point AP, a first station STA1 and a second station STA2 may form a basic service set (BSS1). A third station STA3 may operate in a Bluetooth scheme, and does not belong to the BSS1. The first station STA1 and the second station STA2 may be associated with the access point AP. The second station STA2 may be provided with a combo chip that supports a wireless LAN technology and a Bluetooth technology, and may be associated with the third station STA3 in a Bluetooth scheme. The third station STA3 may represent a master, and the second station STA2 may represent a slave.

The third station STA3 may transmit a data frame 600 (for example, an audio data frame) in a Bluetooth scheme to the second station STA2. The data frame 600 has a size corresponding to 600 μs. The data frame 600 and a data frame 605 transmitted in a Bluetooth scheme may be transmitted with an interval of 2400 μs. The second station STA2 may receive the data frame 600, but the access point AP and the first station STA1 may fail to receive the data frame 600. That is, the access point AP and the first station STA1 may be outside of a range of frame transmission. When the access point AP and the first station STA1 do not recognize the existence of the data frame 600 transmitted from the third station STA3, the access point AP and the first station STA1 may transmit frames 601, 602, 603, 604 and 606 in a wireless LAN scheme without considering the Bluetooth based transmission.

The access point AP desiring to transmit a data frame may transmit a request to send (RTS) frame 601, after a contention window according to a random backoff, when a channel is in an idle state during a distributed inter frame space (DIFS). When the first station STA1 successfully receives the RTS frame 601, the first station STA1 may transmit a clear to send (CTS) frame 602 after a short interframe space (SIFS) from an end time of the RTS frame 601 in response to the RTS frame 601. When the access point AP successfully receives the CTS frame 602, the access point AP may transmit the data frame 603 after an SIFS from an end time of the CTS frame 602.

The access point AP may fail to receive an acknowledgement (ACK) frame, which acknowledges the reception of the data frame 603, from the first station STA1 within an ACK timeout from an end time of the data frame 603. In this case, the access point AP may determine that the data frame 603 is not successfully received by the first station STA1, and thus may transmit the data frame 604 to the first station STA1.

Meanwhile, a transmission duration of the data frame 604 transmitted in a wireless LAN scheme may overlap a transmission duration of the data frame 605 transmitted in a Bluetooth scheme. In this case, the first station STA1 may not be subject to interference by the transmission of the data frame 605 and thus may successfully receive the data frame 604. However, the second station STA2 may be subject to interference by the transmission of the data frame 604 (that is, collision between the data frame 604 and the data frame 605) and thus may fail to successfully receive the data frame 605.

In order to prevent a collision between a frame transmitted in a wireless LAN scheme and a frame transmitted in a Bluetooth scheme, a time duration in the time domain for wireless LAN based transmission may be divided from a time duration in the time domain for a Bluetooth based transmission.

Figure 7:
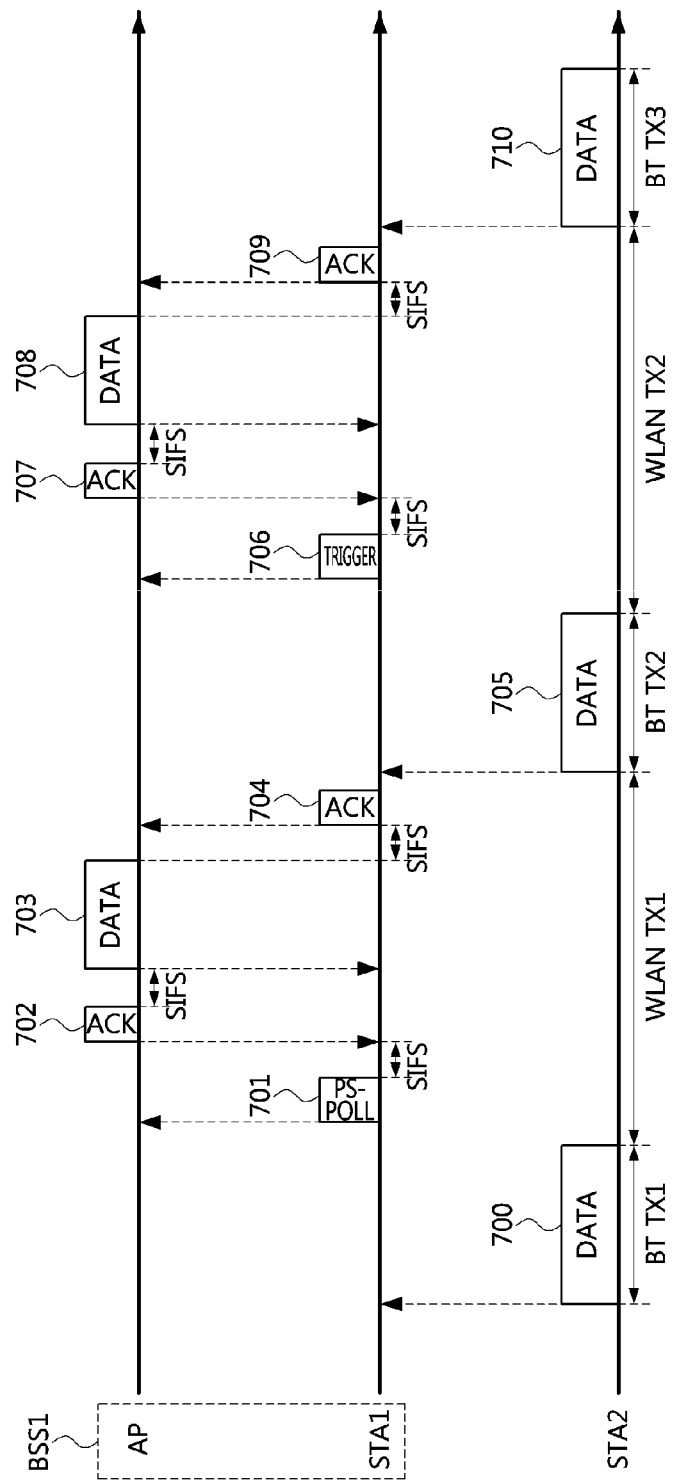
FIG. 7 is a timing chart illustrating a method for transmitting and receiving a frame for coexistence between a wireless local area network (LAN) and Bluetooth according to an example embodiment of the prevent invention.

FIG. 7 is a timing chart illustrating a method for transmitting and receiving a frame for coexistence between a wireless LAN and Bluetooth according to an example embodiment of the prevent invention.

Referring to FIG. 7, an access point AP and a first station STA1 may form a BSS1. A second station STA2 may operate in a Bluetooth scheme, and does not belong to the BSS1. The first station STA1 may be associated with the access point AP. The first station STA1 may be provided with a combo chip that supports a wireless LAN technology and a Bluetooth technology, and may be associated with the second station STA2 in a Bluetooth scheme. The second station STA2 may represent a master, and the first station STA1 may represent a slave. A time duration is classified into BT transmission durations BT TX1, BT TX2 and BT TX3 and WLAN transmission durations WLAN TX1 and WLAN TX2. In the BT transmission durations BT TX1, BT TX2 and BT TX3, frames 700, 705 and 710 may be transmitted and received in a Bluetooth scheme, and in the WLAN transmission durations WLAN TX1 and WLAN TX2, frames 701, 702, 703, 704, 706, 707, 708 and 709 may be transmitted and received in a wireless LAN scheme.

In BT TX1, the second station STA2 may transmit the data frame 700 to the first station STA1 in a Bluetooth scheme. Since there is no frame other than the data frame 700 during the BT transmission duration, the first station STA1 may successfully receive the data frame 700. In WLAN TX1, the first station STA1 may request frame transmission by transmitting a power save-poll (PS-Poll) frame 701 in the wireless LAN scheme. Thereafter, frames 702, 703 and 704 are transmitted and received between the access point AP and the first station STA1.

In BT TX2, the second station STA2 may transmit the data frame 705 to the first station STA1 in a Bluetooth scheme. Since there is no frame other than the data frame 705 during the BT transmission duration, the first station STA1 may successfully receive the data frame 705. In WLAN TX2, the first station STA1 may request frame transmission by transmitting a WiFi multimedia (WMM) trigger frame 706. Thereafter, frames 707, 708 and 709 are transmitted and received between the access point AP and the first station STA1. In BT TX3, the second station STA2 may transmit the data frame 710 to the first station STA1 in a Bluetooth scheme. Since there is no frame other than the data frame 710 during the BT transmission duration, the first station STA1 may successfully receive the data frame 710.

Figure 8:
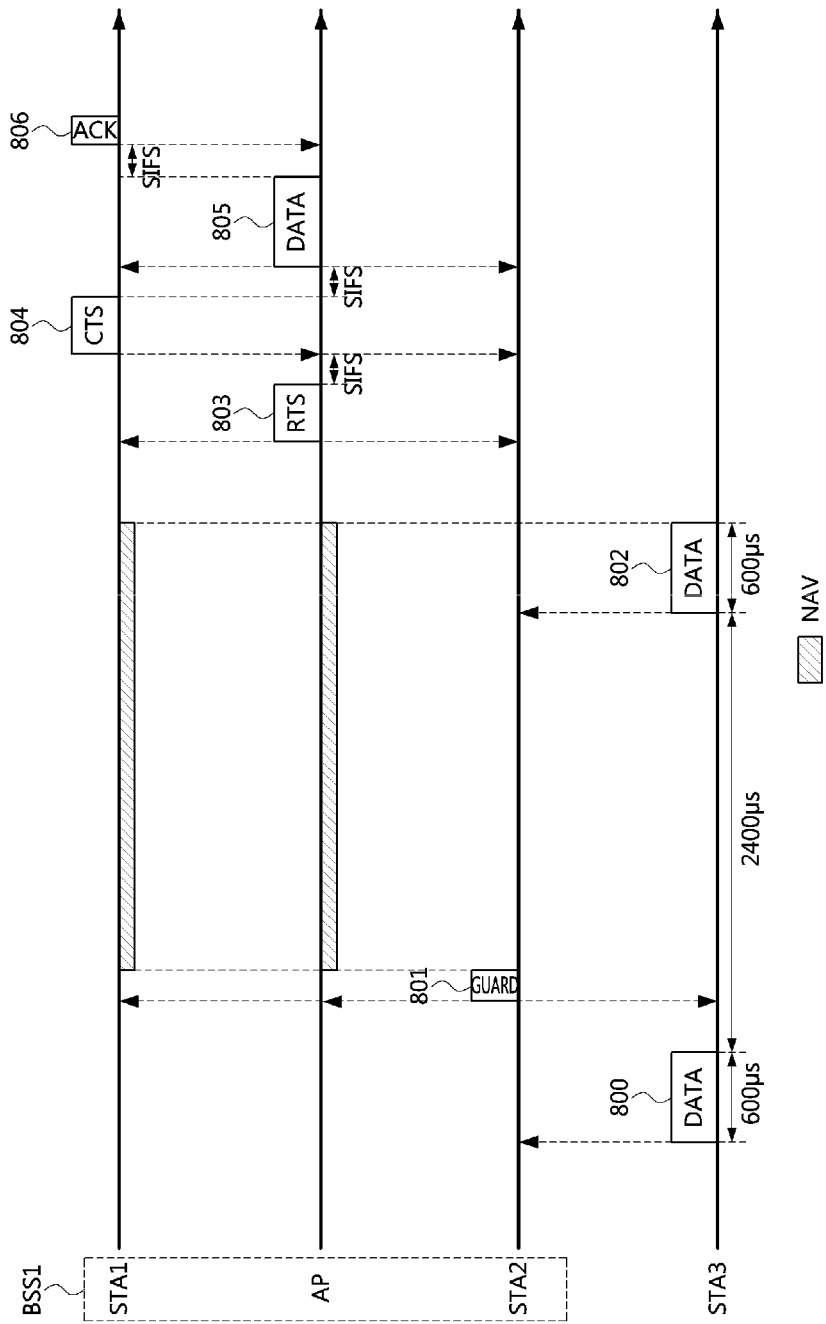
FIG. 8 is a timing chart illustrating a method for transmitting and receiving a frame for coexistence between a wireless LAN and Bluetooth according to another example embodiment of the prevent invention.

FIG. 8 is a timing chart illustrating a method for transmitting and receiving a frame for coexistence between a wireless LAN and Bluetooth according to another example embodiment of the prevent invention.

Referring to FIG. 8, an access point AP, a first station STA1 and a second station STA2 may form BSS1. A third station STA3 may operate in a Bluetooth scheme, and does not belong to the BSS1. The first station STA1 and the second station STA2 may be associated with the access point AP. The second station STA2 may be provided with a combo chip that supports a wireless LAN technology and a Bluetooth technology, and may be associated with the third station STA3 in a Bluetooth scheme. The third station STA3 may represent a master, and the second station STA2 may represent a slave.

The third station STA3 may transmit a data frame 800 (for example, an audio data frame) to the second station STA2 in a Bluetooth scheme. The second station STA2 may receive the data frame 800 from the third station STA3, and identify that a data frame 802 is to be transmitted after 2400 μs from an end point of the data frame 800. The second station STA2 transmits a guard frame 801 in the wireless LAN scheme, to prevent a collision of the data frame 802. The guard frame 801 may include request information for restricting transmission of frames of other communication entities (i.e., the access point AP and the first station STA1) during a time between an end time of the guard frame 801 and an end time of the data frame 802 (for example, information about a duration from an end time of the guard frame 801 to an end time of the data frame 802). The other communication entities each having received the guard frame 801 may set a network allocation vector (NAV) based on the information included in the guard frame 801. In this manner, the transmission of frames of the other communication entities is restricted from an end time of the guard frame 801 to an end time of the data frame 802, so that the second station STA2 successfully receives the data frame 802 from the third station STA3. Meanwhile, when the NAV is ended, frames 803, 804, 805 and 806 are transmitted and received between the access point AP and the first station STA1 in the wireless LAN scheme.

However, the method of preventing a collision between a frame transmitted in the wireless LAN scheme and a frame transmitted in the Bluetooth scheme has various drawbacks. First, when a NAV is set to be long by the guard frame 801, other communication entities are not allowed to access a channel during the set duration of the NAV, so that resources are wasted. According to this method, only the communication entity operating based on the Bluetooth scheme is allowed channel access during a duration set by a NAV, thereby causing a fairness issue. Second, when a NAV is set to be short by the guard frame 801, a frame transmitted in a Bluetooth scheme may be not protected from a frame transmitted in a wireless LAN scheme. That is, a frame transmitted in a wireless LAN may collide with a frame transmitted in a Bluetooth scheme. Third, guard frames 801 need to be transmitted at the respective periods at which a frame is expected to be transmitted in a Bluetooth scheme, and such a frequent transmission of the guard frames 801 may cause a waste of resources. In particular, when the guard frames 801 are transmitted at a low rate for the compatibility with a legacy communication entity, the waste of resources may be further increased.

Figure 9:
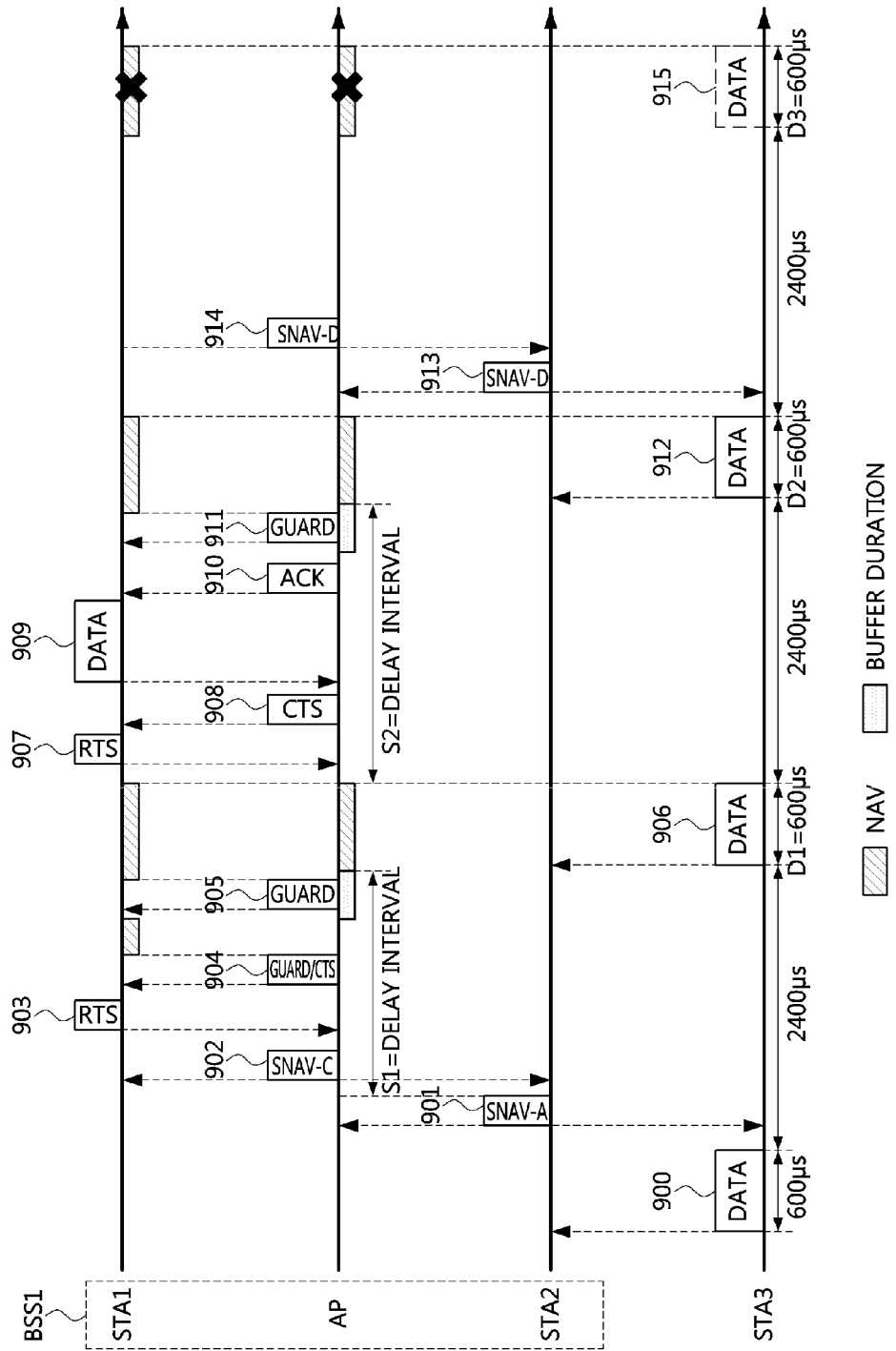
FIG. 9 is a timing chart illustrating a method for transmitting and receiving a frame for coexistence between a wireless LAN and Bluetooth according to still another example embodiment of the prevent invention.

FIG. 9 is a timing chart illustrating a method for transmitting and receiving a frame for coexistence between a wireless LAN and Bluetooth according to another example embodiment of the prevent invention.

Referring to FIG. 9, an access point AP, a first station STA1 and a second station STA2 may form BSS1. A third station STA3 may operate in a Bluetooth scheme, and does not belong to the BSS1. The first station STA1 and the second station STA2 may be associated with the access point AP. The second station STA2 may be provided with a combo chip that supports a wireless LAN technology and a Bluetooth technology, and may be associated with the third station STA3 in a Bluetooth scheme. The third station STA3 may represent a master, and the second station STA2 may represent a slave.

The third station STA3 may transmit a data frame 900 (for example, an audio data frame) to the second station STA2 in a Bluetooth scheme. The second station STA2 may receive the data frame 900 from the third station STA3, and identify that data frames 906, 912 and 915 are to be transmitted at intervals of 2400 μs. The second station STA2 may generate a scheduled NAV-announcement (SNAV-A) frame 901 in order to prevent a collision of the data frame 906. As the SNAV-A frame 901, one of a control frame, a management frame and a data frame defined in IEEE 802.11 may be used, or a newly specified frame may be used. For example, the SNAV-A frame 901 may be specified as an action frame belonging to a management frame, which will be described below.

FIG. 10A is a block diagram illustrating a SNAV-A frame according to the first example embodiment of the present invention, FIG. 10B is a block diagram illustrating a SNAV-A frame according to the second example embodiment of the present invention, and FIG. 10C is a block diagram illustrating a SNAV-A frame according to the third example embodiment of the present invention.

Referring to FIGS. 10A to 10C, a SNAV-A frame 1000 includes a MAC header 1010, a category field 1020, an action field 1030, a transmitter address field 1040, a dialog token field 1050, a schedule counter field 1060 and at least one schedule information field 1071, and 1072 to 107n. The action field 1030 may indicate the type of a current frame. For example, the action field 1030, which is set to a binary number 00, may indicate that the current frame is the SNAV-A frame 1000. The transmitter address field 1040 may be set to a MAC address of a communication entity that transmits the SNAV-A frame 1000. Accordingly, the transmitter address field of the SNAV-A frame 901 illustrated in FIG. 9 may be set to a MAC address of the second station STA2. The dialog token field 1050 may have a unique value for identifying the SNAV-A frame 1000. That is, a communication entity having received the SNAV-A frame 1000 may identify the SNAV-A frame 1000 by using the transmitter address field 1040 and the dialog token field 1050. The schedule counter field 1060 may indicate the number of schedule information fields 1071 and 1072 to 107n included in the SNAV-A frame 1000.

Each of the schedule information fields 1071 and 1072 to 107n may indicate information about an exclusive duration in which channel occupancy is required for transmission or reception of a data frame. The SNAV-A frame 1000 may include the plurality of schedule information fields 1071 and 1072 to 107n.

According to the first embodiment of the present invention, the schedule information fields 1071 and 1072 to 107n may include start time fields 1071-1 and 1072-1 to 107n-1 and duration fields 1071-2 and 1072-2 to 107n-2 of the exclusive durations. The duration fields 1071-2 and 1072-2 to 107n-2 each may indicate a duration time of an exclusive duration in which channel occupancy is required for transmission or reception of a data frame. The start time fields 1071-1 and 1072-1 to 107n-1 of the exclusive durations each may indicate a start time of a corresponding one of the exclusive durations indicated by the duration fields 1071-2 and 1072-2 to 107n-2.

According to the second embodiment of the present invention, the schedule information fields 1071 and 1072 to 107n may include start time fields 1071-1 and 1072-1 to 107n-1 and end time fields 1071-3 and 1072-3 to 107n-3 of the exclusive durations. The start time fields 1071-1 and 1072-1 to 107n-1 of the exclusive durations each may indicate a start time of a corresponding one of the exclusive durations, and the end time fields 1071-3 and 1072-3 to 107n-3 of the exclusive durations each may indicate an end time of a corresponding one of the exclusive durations.

According to the third embodiment of the present invention, the schedule information fields 1071 and 1072 to 107n may include start time fields 1071-4 and 1072-4 to 107n-4, duration fields 1071-2 and 1072-2 to 107n-2, interval fields 1071-5 and 1072-5 to 107n-5 of communication durations, and end time indicating fields 1071-6 and 1072-6 to 107n-6 of communication durations. The start time fields 1071-4 and 1072-4 to 107n-4 of communication durations each may indicate a start time of a communication duration including at least one exclusive duration (for example, a duration from an end time of the data frame 900 to an end time of the data frame 915, or a duration from an end time of the SNAV-A frame 901 to an end time of the data frame 915). When a plurality of schedule information fields 1071 and 1072 to 107n exist, only the first schedule information field 1071 may include the start time field 1071-4 of a communication duration. The interval fields 1071-5 and 1072-5 to 107n-5 may each indicate an interval time between exclusive durations. However, the interval field 1071-5 included in the first schedule information field 1071 may include an interval time between the data frame 900 and the data frame 906, or an interval time between the SNAV-A frame 901 and the data frame 906. The end time indicating fields 1071-6 and 1072-6 to 107n-6 of the communication durations may each include information indicating an end time of a corresponding one of the communication durations. The information indicating an end time of a communication duration may represent a duration time of a communication duration, the number of exclusive durations included in a communication duration or an end time of a communication duration. When a plurality of schedule information fields 1071 and 1072 to 107n exist, only the first schedule information field 1071 may include the end time indicating field 1071-6 of a communication duration. Meanwhile, the schedule information fields 1071 and 1072 to 107n according to the third embodiment of the present invention may not include the end time indicating fields 1071-6 and 1072-6 to 107n-6 of the communication durations. In this case, the communication duration may be maintained until the communication duration is disabled by SNAV-D frames 913 and 914. In FIG. 9, the second station STA2 may transmit the SNAV-D frame 913 for disabling of the communication durations, and other stations having received the SNAV-D frame 913 may disable the communication durations. The access point AP having received the SNAV-D frame 913 may transmit the SNAV-D frame 914 to instruct disabling of a communication duration of a station corresponding to a hidden node.

Referring again to FIG. 9, the following description will be made in relation to the SNAV-A frame according to the first embodiment of the present invention. The SNAV-A frame according to the second embodiment or the third embodiment of the present invention may include information about an exclusive duration in the similar way as with the SNAV-A frame according to the first embodiment. The SNAV-A frame 901 includes a first schedule information field for the data frame 906, a second schedule information field for the data frame 912 and a third schedule information field for the data frame 915. The first schedule information field may include a duration field, indicating a duration time of an exclusive duration D1 in which channel occupancy is required for the reception of the data frame 906, and an exclusive duration start time field, indicating a delay interval time S1 from an end time of the SNAV-A frame 901 to a start time of the exclusive duration D1 indicated by the duration field. The second schedule information field may include a duration field, indicating a duration time of an exclusive duration D2 in which channel occupancy is required for reception of the data frame 912, and an exclusive duration start time field, indicating a delay interval time S2 from an end time of the data frame 906 (or an end time of the SNAV-A frame 901) to a start time of the exclusive duration D2 indicated by the duration field. The third schedule information field may include a duration field, indicating a duration time of an exclusive duration D3 in which channel occupancy is required for reception of the data frame 915, and an exclusive duration start time field, indicating a delay interval time S3 from an end time of the data frame 912 (or an end time of the SNAV-A frame 901) to a start time of the exclusive duration D3 indicated by the duration field.

The second station STA2 may transmit the SNAV-A frame 901 through a channel to request and/or reserve at least one periods D1, D2 and D3 for transmission or reception of at least one data frames 906, 912 and 915. The periods D1, D2 and D3 may be the exclusive durations which may be contention-free periods (CFPs) during which stations are not allowed to contend for the channel. The periods D1, D2 and D3 may be made by the SNAV-A frame 901 and/or a SNAV-C (clear) frame 902 into the exclusive durations which may be the CFPs during which stations are not allowed to contend for the channel, for stations which can receive and decode the SNAV-A frame 901 and/or the SNAV-C frame 902. The periods D1, D2 and D3 may be made by a guide frame 905 into the exclusive durations which may be CFPs during which stations are not allowed to contend for the channel, for stations which can neither receive the SNAV-A frame 901 nor the SNAV-C frame 902 or for stations which can neither decode the SNAV-A frame 901 nor the SNAV-C frame 902 or for all stations. In this case, the second station STA2 may transmit the SNAV-A frame 901 to the access point AP associated with the second station STA2, after a contention window according to a random backoff, when a channel is in an idle state during a DIFS. Alternatively, the second station STA2 may transmit the SNAV-A frame 901 in a multicast or broadcast scheme.

The access point AP, upon receiving the SNAV-A frame 901, may identify the SNAV-A frame 901 based on the transmitter address field and the dialog token field, and may set a NAV for a duration indicated by the schedule information field. In addition, the access point AP, upon receiving the SNAV-A frame 901, may transmit a response frame (for example, an ACK frame) after an SIFS from an end time of the SNAV-A frame 901 in response to the SNAV-A frame 901. The access point AP may transmit, in response to the SNAV-A frame 901 or without receiving the SNAV-A frame 901, the SNAV-C frame 902 in a multicast or broadcast scheme to confirm, request, notify and/or reserve the periods D1, D2 and/or D3, after a contention window according to a random backoff, when a channel is in an idle state after the SIFS from an end time of the SNAV-A frame 901 or during a DIFS. The SNAV-C frame 902 may have the same configuration as that of the SNAV-A frame 901. For example, a dialog token field of the SNAV-C frame 902 may be set to have the same value as that of the dialog token field of the SNAV-A frame 901. However, in order to indicate that the current frame is the SNAV-C frame 902, an action field included in the SNAV-C frame 902 may be set to a binary number 01. A transmitter address field included in the SNAV-C frame 902 may be set to a MAC address of the access point AP. An exclusive duration start time field of a schedule information field included in the SNAV-C frame 902 may indicate a duration from an end time of the SNAV-C frame 902 to a start time of an exclusive duration indicated by a duration field. Other fields included in the SNAV-C frame 902 except for the action field, the transmitter address field and the schedule information field may be the same as those included in the SNAV-A frame 901.

Meanwhile, when the first station STA1 fails to receive at least one of the SNAV-A frame 901 and the SNAV-C frame 902, or conforms to a previous standard made before an IEEE 802.11 standard, which defines the SNAV-A frame 901 and the SNAV-C frame 902 (that is, fails to decode the SNAV-A frame 901 and the SNAV-C frame 902), the first station STA1 does not know whether an exclusive duration indicated by the SNAV-A frame 901 or the SNAV-C frame 902 is occupied by other stations and frame transmission is limited. When the first station STA1 has data desired to be transmitted to the access point AP, the first station STA1 may transmit an RTS frame 903 to the access point AP, because an interval between an end time of the SNAV-A frame 901 and a start time of the exclusive duration D1 or an interval between an end time of the SNAV-C frame 902 and a start time of the exclusive duration D1 is a contention period during which stations are allowed to contend for the channel. The access point AP having received the RTS frame 903 may transmit a guard frame 904 when a duration indicated by a duration field included in the RTS frame 903 overlaps an exclusive duration indicated by the SNAV-A frame 901 or the SNAV-C frame 902, to prevent frame collision in the overlapped duration. In this case, the guard frame 904 may represent a self-CTS frame, and represent a control frame having a duration field for NAV setting, a management frame having a duration field for NAV setting or a data frame having a duration field for NAV setting. The duration field included in the guard frame 904 may indicate a duration time falling within a range between an end time of the guard frame 904 and a start time indicated by an exclusive duration start time field of a first schedule information field included in the SNAV-A frame 901 or the SNAV-C frame 902. The first station STA1, upon receiving the guard frame 904, may abandon a current transmission opportunity involving the RTS frame 903, or try to get a new transmission opportunity.

The CFP may be a time period during the operation of a point coordination function (PCF) when the right to transmit is assigned to stations (STAs) solely by a point coordinator (PC), allowing frame exchanges to occur between members of the BSS without contention for the wireless medium (WM). The PC may be the entity within the STA in an AP that performs the PCF. The contention period (CP) may be a time period outside of the CFP in a point-coordinated BSS. In a BSS where there is no PC, the CP corresponds to the entire time of operation of the BSS.

When a duration indicated by a duration field included in the RTS frame 903 does not overlap an exclusive duration indicated by the SNAV-A frame 901 or the SNAV-C frame 902, the access point AP may transmit a CTS frame 904 having duration information included in the RTS frame 903. Even when a duration indicated by a duration field included in the RTS frame 903 overlaps an exclusive duration indicated by the SNAV-A frame 901 or the SNAV-C frame 902, the access point AP may transmit a CTS frame 904 including information about a duration that does not overlap the exclusive duration. The first station STA1, upon receiving the CTS frame 904, may transmit a data frame to the access point AP when transmission of the data frame is possible during a duration time indicated by a duration field included in the CTS frame 904. Meanwhile, the first station STA1 may not transmit a data frame to the access point AP if transmission of the data frame is not possible during a duration time indicated by a duration field included in the CTS frame 904.

Meanwhile, for a legacy station that conforms to a previous standard made before an IEEE 802.11 standard, which defines the SNAV-A frame 901 and the SNAV-C frame 902, the legacy station is unable to decode the SNAV-A frame 901 and the SNAV-C frame 902, in order to prevent a collision between frames in an exclusive duration indicated by the SNAV-A frame 901 or the SNAV-C frame 902, the access point AP may transmit the guard frame 905 in a preset duration (a buffer duration) that is set to be prior to a start time indicated by an exclusive duration start time field of the first schedule information field. In this case, the guard frame 905 may represent a self-CTS frame (CTS-to-self), and represent a control frame having a duration field for NAV setting, a management frame having a duration field for NAV setting or a data frame having a duration field for NAV setting. A duration field of the guard frame 905 may indicate a duration time falling within a range between an end time of the guard frame 905 and an end time of an exclusive duration indicated by a duration field of the first schedule information field. Each communication entity having received the guard frame 905 may set a NAV based on a duration time indicated by the duration field included in the guard frame 905.

Stations which can receive and decode the SNAV-A frame 901 or the SNAV-C 902 frame except the AP and the STA2 may set delayed NAV for the exclusive durations D1, D2, and/or D3.

The third station STA3 may transmit the data frame 906 to the second station STA2 in a Bluetooth scheme. As described above, other communication entities do not transmit frames in a transmission duration of the data frame 906 (that is, an exclusive duration), so the second station STA2 successfully receives the data frame 906.

Then, when the first station STA1 has data that is to be transmitted to the access point AP, the first station STA1 may transmit an RTS frame 907 to the access point AP, because an interval between the durations D1 and D2 is a contention period during which stations are allowed to contend for the channel. The access point AP having received the RTS frame 907 may transmit a CTS frame 908 when a duration indicated by a duration field included in the RTS frame 907 does not overlap an exclusive duration indicated by a duration field of a second schedule information field included in the SNAV-A frame 901 or the SNAV-C frame 902. A duration field included in the CTS frame 908 may indicate a duration time from an end time of the CTS frame 908 to an end time of an ACK frame 910. The first station STA1, upon receiving the CTS frame 908 may transmit a data frame 909 to the access point AP. The access point AP, upon successfully receiving the data frame 909, may transmit, to the first station STA1, the ACK frame 910 in response to the data frame 909. The first station STA1, upon receiving the ACK frame 910, determines that the data frame 909 is successfully received by the access point AP.

Meanwhile, the access point AP may transmit a guard frame 911 in a preset duration that is set to be prior to a start time indicated by an exclusive duration start time field of the second schedule information field (that is, a buffer duration) in order to prevent a collision between frames in the exclusive duration indicated by the second schedule information field. In this case, the guard frame 911 may represent a self-CTS frame, and represent a control frame having a duration field for NAV setting, a management frame having a duration field for NAV setting or a data frame having a duration field for NAV setting. The duration field included in the guard frame 911 may indicate a duration time falling within a range between an end time of the guard frame 911 and an end time of an exclusive duration indicated by a duration field of the second schedule information field. Each communication entity having received the guard frame 911 may set a NAV based on a duration time indicated by the duration field included in the guard frame 911.

The third station STA3 may transmit the data frame 912 to the second station STA2 in a Bluetooth scheme. As described above, other communication entities do not transmit frames in a transmission duration of the data frame 912, the second station STA2 successfully receives the data frame 912.

Meanwhile, the second station STA2 may generate a SNAV-D (delete) frame 913 in order to cancel the NAV set based on the third schedule information field included in the SNAV-A frame 901. As the SNAV-D frame 913, one of a control frame, a management frame and a data frame defined in IEEE 802.11 may be used, or a newly specified frame may be used. For example, the SNAV-D frame 913 may include a MAC header 1010, a category field 1020, an action field 1030, a transmitter address field 1040, a dialog token field 1050 that are illustrated in FIGS. 10A to 10C. The action field 1030 may indicate the type of a current frame. For example, the action field 1030, which is set to a binary number 10, may indicate that the current frame is the SNAV-D frame 913. The transmitter address field 1040 may be set to a MAC address of a communication entity that transmits the SNAV-D frame 913. Accordingly, the transmitter address field of the SNAV-D frame 913 may be set to a MAC address of the second station STA2. The dialog token field 1050 may be set to the same value as a value of a dialog token field of the SNAV-A frame 901 or the SNAV-C frame 902. That is, the dialog token field 1050 may indicate that the NAV set based on the SNAV-A frame 901 needs to be canceled.

The second station STA2 may transmit the SNAV-D frame 913. In this case, the second station STA2 may transmit the SNAV-D frame 913 to the access point AP associated with the second station STA2, after a contention window according to a random backoff, when a channel is in an idle state during a DIFS. Alternatively, the second station STA2 may transmit the SNAV-D frame 913 in a multicast or broadcast scheme.

The access point AP, upon receiving the SNAV-D frame 913, may identify through a value set in the dialog token field of the SNAV-D frame 913 that the NAV set based on SNAV-A frame 901 needs to be cancelled. Accordingly, the access point AP may cancel the NAV set based on the third schedule information field of the SNAV-A frame 901. In addition, the access point AP, upon receiving the SNAV-D frame 913, may transmit a response frame (for example, an ACK frame) after a SIFS from an end time of the SNAV-D frame 913 in response to the SNAV-D frame 913. Alternatively, the access point AP may transmit, in response to the SNAV-D frame 913, a SNAV-D frame 914 in a multicast or broadcast scheme, after a contention window according to a random backoff, when a channel is in an idle state after an SIFS from an end time of the SNAV-D frame 913 or during a DIFS. The SNAV-D frame 914 may have the same configuration as that of the SNAV-D frame 913. However, a transmitter address field included in the SNAV-D frame 914 may be set to a MAC address of the access point AP. Other fields included in the SNAV-D frame 914 except for the transmitter address field may be the same as those included in the SNAV-D frame 913. The first station STA1, upon receiving the SNAV-D frame 914, may identify through a value set in the dialog token field of the SNAV-D frame 914 that the NAV set based on the SNAV-A frame 901 or the SNAV-C frame 902 needs to be cancelled. Accordingly, the first station STA1 may cancel the NAV set based on the third schedule information field of the SNAV-A frame 901 or the SNAV-C frame 902.

As is apparent from the above, a NAV can be set to delay by a preset time through a SNAV-A frame or a SNAV-C frame. The set NAV can be cancelled by a SNAV-D frame. Such a construction can prevent a collision between a frame transmitted and received based on a wireless LAN technology and frames transmitted and received based on other communication technologies. In addition, channel access through other communication technologies except for wireless LAN technology is prevented from being excessively limited due to a NAV set based on a SNAV-A frame or a SNAV-C frame. Accordingly, fairness in channel access is ensured between a wireless LAN technology and other communication technologies.

In above embodiments, the exclusive duration which may be the CFP may be used for preventing collision between two kinds of frames, but the present invention does not need to be limited to these embodiments. The exclusive duration or the CFP may be used as a duration during which the AP or the PC coordinates frame exchanges as well.

While the example embodiments of the present invention and their advantages have been described in detail, it should be understood that various changes, substitutions and alterations may be made herein without departing from the scope of the invention.

What is claimed is:

1. A communication method performed in a communication station, comprising:
    transmitting, by the communication station to an access point (AP), a request frame requesting the access point to schedule one or more durations, wherein a first group of one or more stations is allowed to participate in a communication between non-AP stations during the one or more durations, and a second group of one or more stations is prohibited from transmitting any frames during the one or more durations; and
    receiving, by the communication station from the access point, a response frame of the request frame,
    wherein the communication station is not an access point, and
    wherein the request frame includes information on a start time of an earliest duration of the one or more durations, and information on a time length of the one or more durations.

2. The communication method of claim 1, further comprising:
    receiving, from the access point, a setup frame immediately followed by a scheduled duration, wherein during the scheduled duration the first group is allowed to participate in the communication between non-AP stations and the second group is prohibited from transmitting any frame.

3. The communication method of claim 2, wherein the response frame includes information on the start time of the earliest duration of the one or more durations, information on the time length of the one or more durations, and information on an interval between two consecutive durations of the one or more durations.

4. The communication method of claim 3, wherein the response frame further includes information indicating an end time of the one or more durations.

5. The communication method of claim 4, wherein the response frame further includes a dialog token field identifying a dialog related to the response frame.

6. The communication method of claim 1, wherein the request frame further includes information on an interval between two consecutive durations of the one or more durations.

7. The communication method of claim 6, wherein the request frame further includes information indicating an end time of the one or more durations.

8. The communication method of claim 7, wherein the request frame further includes a dialog token field identifying a dialog related to the request frame.

9. The communication method of claim 1, wherein the request frame is an action frame belonging to a first management frame, and the response frame is an action frame belonging to a second management frame.

10. A communication method performed in an access point (AP), comprising:
    receiving, from the communication station, a request frame requesting the access point to schedule one or more durations, wherein a first group of one or more stations is allowed to participate in a communication between non-AP stations during the one or more durations, and a second group of one or more stations is prohibited from transmitting any frames during the one or more durations; and
    transmitting, to the communication station, a response frame of the request frame,
    wherein the communication station is not an access point, and
    wherein the request frame includes information on a start time of an earliest duration of the one or more durations, and information on a time length of the one or more durations.

11. The communication method of claim 10, further comprising:
    transmitting a setup frame immediately followed by a scheduled duration, wherein during the scheduled duration the first group is allowed to participate in the communication between non-AP stations and the second group is prohibited from transmitting any frames.

12. The communication method of claim 11, wherein the response frame includes information on the start time of the earliest duration of the one or more durations, information on the time length of the one or more durations, and information on an interval between two consecutive durations of the one or more durations.

13. The communication method of claim 12, wherein the response frame further includes information indicating an end time of the one or more durations.

14. The communication method of claim 13, wherein the response frame further includes a dialog token field identifying a dialog related to the response frame.

15. The communication method of claim 10, wherein the request frame further includes information on an interval between two consecutive durations of the one or more durations.

16. The communication method of claim 15, wherein the request frame further includes information indicating an end time of the one or more durations.

17. The communication method of claim 16, wherein the request frame further includes a dialog token field identifying a dialog related to the request frame.

18. The communication method of claim 10, wherein the request frame is an action frame belonging to a first management frame, and the response frame is an action frame belonging to a second management frame.

* * * * *